US012598055B2

(12) United States Patent
Ke

(10) Patent No.: US 12,598,055 B2
(45) Date of Patent: *Apr. 7, 2026

(54) INFORMATION CONTROL METHOD AND COMMUNICATIONS DEVICE

(71) Applicant: VIVO MOBILE COMMUNICATION CO., LTD., Dongguan (CN)

(72) Inventor: Xiaowan Ke, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 8 days.

This patent is subject to a terminal disclaimer.

(21) Appl. No.: 18/747,365

(22) Filed: Jun. 18, 2024

(65) Prior Publication Data

US 2024/0340155 A1 Oct. 10, 2024

Related U.S. Application Data

(63) Continuation of application No. 17/880,599, filed on Aug. 3, 2022, now Pat. No. 12,047,482, which is a
(Continued)

(30) Foreign Application Priority Data

Feb. 13, 2020 (CN) .......................... 202010091590.9

(51) Int. Cl.
*H04L 7/00* (2006.01)
*H04J 3/06* (2006.01)
(Continued)

(52) U.S. Cl.
CPC .......... *H04L 7/0037* (2013.01); *H04J 3/0667* (2013.01); *H04J 3/0673* (2013.01);
(Continued)

(58) Field of Classification Search
None
See application file for complete search history.

(56) References Cited

U.S. PATENT DOCUMENTS 5,327,425 A 7/1994 Niwa
5,369,682 A * 11/1994 Witsaman ........... H04W 84/022
455/503

(Continued)

FOREIGN PATENT DOCUMENTS

| CN | 110213007 A | 9/2019 |
| CN | 110535552 A | 12/2019 |
| CN | 110611924 A | 12/2019 |

OTHER PUBLICATIONS

International Search Report issued in corresponding International Application No. PCT/CN2021/076520, mailed May 10, 2021, 4 pages.
(Continued)

*Primary Examiner* — Phuoc H Nguyen
(74) *Attorney, Agent, or Firm* — IPX PLLC

(57) ABSTRACT

An information control method and a communications device are provided. First time information is adjusted to second time information according to information about a clock difference between a first clock and a second clock. The first time information is time-related information based on the first clock, and the second time information is time-related information based on the second clock. First information is sent. The first information includes the first time information. The first time information includes at least one of the following: a first User Equipment (UE)-Device-Side Time-Sensitive Network Translator (Device-Side TSN Translator (DS-TT)) residence time, or a first Packet Delay Budget (PDB).

15 Claims, 4 Drawing Sheets

Obtain delay requirement information and a UE-DS-TT residence time 51

Execute at least one of the following according to the delay requirement information and the UE-DS-TT residence time: determining a PDB-related delay, and mapping a communications network QoS 52

Related U.S. Application Data continuation of application No. PCT/CN2021/076520, filed on Feb. 10, 2021.

(51) Int. Cl.

| | |
|---|---|
| *H04L 47/28* | (2022.01) |
| *H04L 47/283* | (2022.01) |
| *H04W 56/00* | (2009.01) |

(52) U.S. Cl.
CPC ............ *H04L 7/0012* (2013.01); *H04L 47/28* (2013.01); *H04L 47/283* (2013.01); *H04W 56/00* (2013.01); *H04W 56/004* (2013.01)

(56) References Cited

U.S. PATENT DOCUMENTS

| | | | | |
|---|---|---|---|---|
| 5,604,775 | A * | 2/1997 | Saitoh | H03L 7/0814 |
| | | | | 331/25 |
| 5,610,954 | A * | 3/1997 | Miyashita | H03L 7/0891 |
| | | | | 331/25 |
| 6,144,675 | A | 11/2000 | Wakabayashi | |
| 8,351,437 | B2 | 1/2013 | Haartsen | |
| 8,725,525 | B2 | 5/2014 | Yamaki | |
| 2002/0140478 | A1 * | 10/2002 | Fletcher | H03K 5/15013 |
| | | | | 327/175 |
| 2005/0058149 | A1 | 3/2005 | Howe | |
| 2007/0140398 | A1 | 6/2007 | Inoue | |
| 2011/0150007 | A1 | 6/2011 | Choi | |
| 2011/0292797 | A1 * | 12/2011 | Bejerano | H04L 12/66 |
| | | | | 370/230.1 |
| 2014/0122915 | A1 | 5/2014 | Frels | |
| 2014/0340121 | A1 * | 11/2014 | Ozasa | H03L 7/0891 |
| | | | | 327/12 |
| 2019/0239172 | A1 | 8/2019 | Hampel et al. | |
| 2019/0357165 | A1 | 11/2019 | Koelemeij | |
| 2020/0004498 | A1 | 1/2020 | Millington | |
| 2020/0259896 | A1 | 8/2020 | Sachs | |
| 2022/0159602 | A1 * | 5/2022 | Wei | H04W 24/06 |

OTHER PUBLICATIONS

Samsung, "[#13] Bridge Delay Time Conversion", 3GPP TSG-WG SA2 Meeting #136 AH S2-2000800, Jan. 2020.
Nokia et al, "Clarification for TSC QoS Mapping clause", SA WG2 Meeting #136 S2-1912362, Nov. 2019.
First Office Action issued in related Chinese Application No. 202010091590.9, mailed Dec. 2, 2021, 8 pages.
Huawei et al. "update for Bridge Delay information reporting", 3GPP TSG-WG SA2 Meeting #136, S2-1911171, Nov. 2019.
Huawei et al. "update for Bridge Delay information reporting", 3GPP TSG-WG SA2 Meeting #135 S2-1908940, Oct. 2019.
Nokia et al. "5GS Bridge Delay Reporting", SA WG2 Meeting #136, S2-1910957, Oct. 2019.
Nokia et al. "5GS Bridge Delay Reporting", SA WG2 Meeting #135, S2-1909729, Oct. 2019.

* cited by examiner

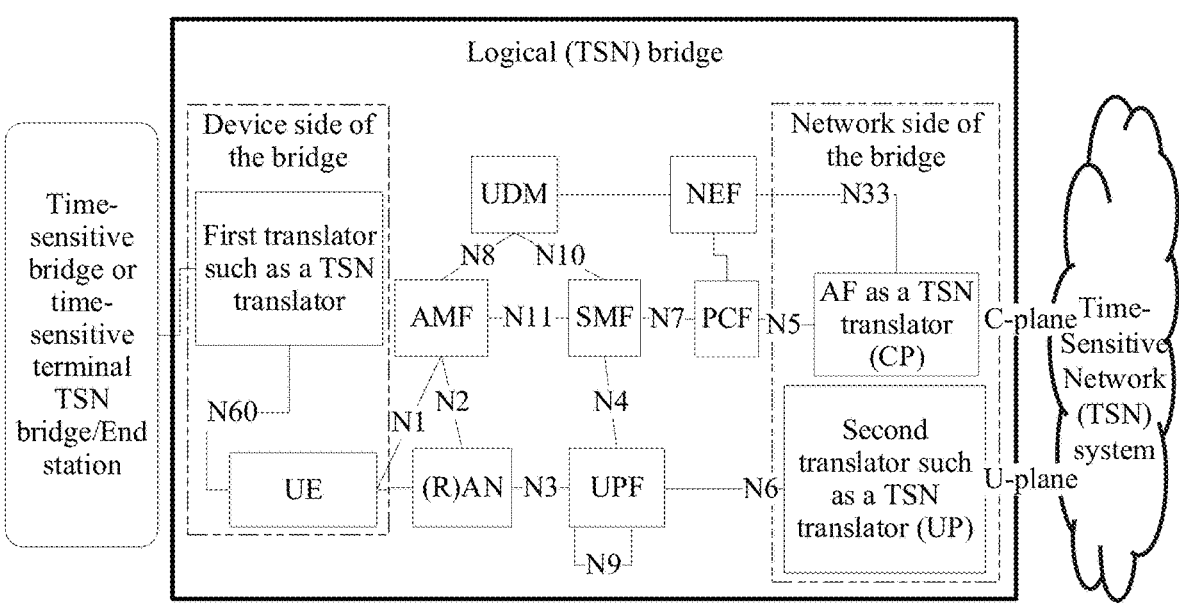

FIG. 1

| | 21 |
|---|---|
| Adjust first time information to second time information according to information about a clock difference between a first clock and a second clock | |

↓

| | 22 |
|---|---|
| Send first information | |

FIG. 2

| | 31 |
|---|---|
| Obtain first information | |

↓

| | 32 |
|---|---|
| Execute at least one of the following operations: determining a first delay according to the first information; determining a second delay according to the first information; determining delay requirement information according to the first information; sending the delay requirement information to a network element in a communications network; sending bridge delay information to a third-party network or a third-party application; executing a first operation when it is determined that a first condition is met; and executing a second operation when it is determined that a second condition is met | |

FIG. 3

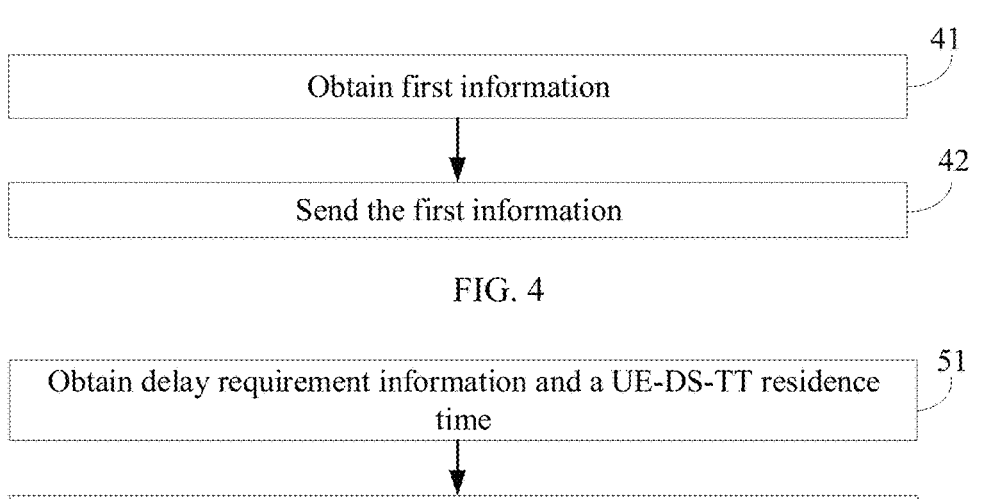
41
Obtain first information
42
Send the first information
FIG. 4
51
Obtain delay requirement information and a UE-DS-TT residence time
52
Execute at least one of the following according to the delay requirement information and the UE-DS-TT residence time: determining a PDB-related delay, and mapping a communications network QoS
FIG. 5
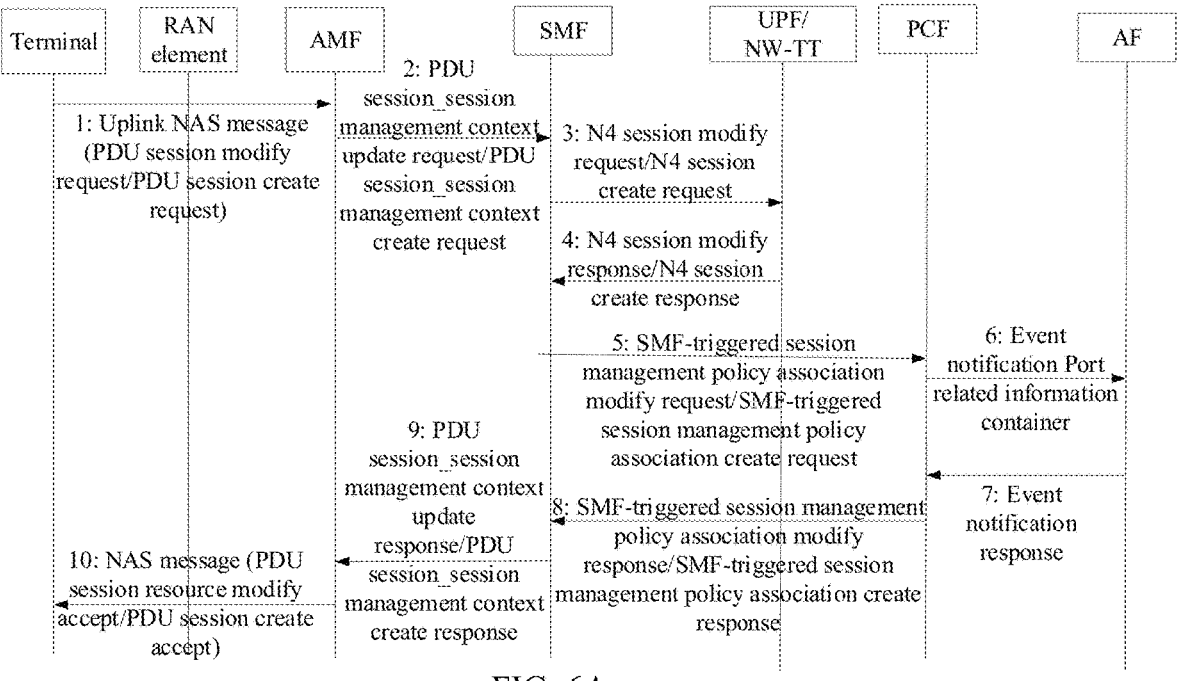
FIG. 6A

INFORMATION CONTROL METHOD AND COMMUNICATIONS DEVICE

CROSS-REFERENCE TO RELATED APPLICATIONS

This application is a continuation of U.S. application Ser. No. 17/880,599, filed on Aug. 3, 2022, which is a continuation of International Application No. PCT/CN2021/076520, filed on Feb. 10, 2021, which claims priority to Chinese Patent Application No. 202010091590.9, filed on Feb. 13, 2020. The entire contents of each of the above-identified applications are expressly incorporated herein by reference.

TECHNICAL FIELD

The present disclosure relates to the field of communications technologies, and in particular, to an information control method and a communications device.

BACKGROUND

Many vertical industries have requirements on time-sensitive communication. For example, in industrial Internet, time-related data, such as a robot instruction, needs to be executed sequentially within a specified time, and a requirement on time precision is high. A time-sensitive network is proposed to support transmission of time-sensitive data.

In a Time-Sensitive Network (TSN), data may be forwarded between a transmit end and a receive end of a time-related data stream by using one or more bridges. In a bridge formed by a mobile communications network and a time-sensitive network, different control nodes have different control requirements for time-related information. In addition, a local clock exists in the bridge, and a TSN clock exists in the TSN network. Different control nodes may have different requirements on reference clocks. Therefore, how to determine and transmit time-related information of different nodes is a current technical problem that needs to be solved urgently, thereby implementing a time-related service.

SUMMARY

Embodiments of the present disclosure provide an information control method and a communications device.

According to a first aspect, an embodiment of the present disclosure provides an information control method, applied to a first communications device and including:

adjusting first time information to second time information according to information about a clock difference between a first clock and a second clock, where the first time information is time-related information based on the first clock, and the second time information is time-related information based on the second clock; and sending first information, where the first information includes at least one of the following: the first time information, the second time information, clock information of the first clock, and clock information of the second clock.

According to a second aspect, an embodiment of the present disclosure provides an information control method, applied to a second communications device and including:

obtaining first information; and executing at least one of the following operations:

determining a first delay according to the first information;

determining a second delay according to the first information;

determining delay requirement information according to the first information;

sending the delay requirement information to a network element in a communications network;

sending bridge delay information to a third-party network or a third-party application;

executing a first operation when it is determined that a first condition is met; and executing a second operation when it is determined that a second condition is met, where the first information includes at least one of the following: first time information, second time information, clock information of a first clock, and clock information of a second clock;

the first time information is time-related information based on the first clock;

the second time information is time-related information based on the second clock;

the first condition includes: the first clock is a communications network clock; and the second condition includes: the second clock is a communications network external clock.

According to a third aspect, an embodiment of the present disclosure provides an information control method, applied to a third communications device and including:

obtaining first information; and sending the first information, where the first information includes at least one of the following: first time information, second time information, clock information of a first clock, and clock information of a second clock; the first time information is time-related information based on the first clock; and the second time information is time-related information based on the second clock.

According to a fourth aspect, an embodiment of the present disclosure provides an information control method, applied to a fourth communications device and including:

obtaining delay requirement information and a UE-DS-TT residence time; and executing at least one of the following according to the delay requirement information and the UE-DS-TT residence time: determining a PDB-related delay, and mapping a communications network quality of service QoS.

According to a fifth aspect, an embodiment of the present disclosure provides a communications device, where the communications device is a first communications device and includes:

a processing module, configured to adjust first time information to second time information according to information about a clock difference between a first clock and a second clock, where the first time information is time-related information based on the first clock, and the second time information is time-related information based on the second clock; and a first sending module, configured to send first information, where the first information includes at least one of the following: the first time information, the second time information, clock information of the first clock, and clock information of the second clock.

3

According to a sixth aspect, an embodiment of the present disclosure provides a communications device, where the communications device is a second communications device and includes:

a first obtaining module, configured to obtain first information; and a first execution module, configured to execute at least one of the following operations:

determining a first delay according to the first information;

determining a second delay according to the first information;

determining delay requirement information according to the first information;

sending the delay requirement information to a network element in a communications network;

sending bridge delay information to a third-party network or a third-party application;

executing a first operation when it is determined that a first condition is met; and executing a second operation when it is determined that a second condition is met, where the first information includes at least one of the following: first time information, second time information, clock information of a first clock, and clock information of a second clock;

the first time information is time-related information based on the first clock;

the second time information is time-related information based on the second clock;

the first condition includes: the first clock is a communications network clock; and the second condition includes: the second clock is a communications network external clock.

According to a seventh aspect, an embodiment of the present disclosure provides a communications device, where the communications device is a third communications device and includes:

a second obtaining module, configured to obtain first information; and a second sending module, configured to send the first information, where the first information includes at least one of the following: first time information, second time information, clock information of a first clock, and clock information of a second clock; the first time information is time-related information based on the first clock; and the second time information is time-related information based on the second clock.

According to an eighth aspect, an embodiment of the present disclosure provides a communications device, where the communications device is a fourth communications device and includes:

a third obtaining module, configured to obtain delay requirement information and a UE-DS-TT residence time; and a second execution module, configured to execute at least one of the following according to the delay requirement information and the UE-DS-TT residence time: determining a PDB-related delay, and mapping a communications network quality of service QoS.

According to a ninth aspect, an embodiment of the present disclosure provides a communications device, including a processor, a memory, and a computer program stored in the memory and running on the processor, where the computer program is executed by the processor to implement the steps of the information control method provided in the first aspect, or implement the steps of the information control method provided in the second aspect, or implement the steps of the information control method provided in the third aspect, or implement the steps of the information control method provided in the fourth aspect.

According to a tenth aspect, an embodiment of the present disclosure provides a computer-readable storage medium, where the computer-readable storage medium stores a computer program, and the computer program is executed by a processor to implement the steps of the information control method provided in the first aspect, or implement the steps of the information control method provided in the second aspect, or implement the steps of the information control method provided in the third aspect, or implement the steps of the information control method provided in the fourth aspect.

In the embodiments of the present disclosure, different time-related information may be determined based on requirements of different communications network nodes, and time-related information based on different clocks may be sent based on requirements of different network nodes, thereby implementing a time-related service.

BRIEF DESCRIPTION OF DRAWINGS

Accompanying drawings are merely used for showing the embodiments, but not considered as a limitation on the present disclosure. In all accompanying drawings, a same reference symbol is used to indicate a same part. In the accompanying drawings:

FIG. 1 is a schematic architectural diagram of a wireless communications system to which the embodiments of the present disclosure can be applied;

FIG. 2 is a flowchart of an information control method according to an embodiment of the present disclosure;

FIG. 3 is a flowchart of another information control method according to an embodiment of the present disclosure;

FIG. 4 is a flowchart of another information control method according to an embodiment of the present disclosure;

FIG. 5 is a flowchart of another information control method according to an embodiment of the present disclosure;

FIG. 6A is a schematic diagram of an application scenario according to an embodiment of the present disclosure;

DETAILED DESCRIPTION

Figure 6B:
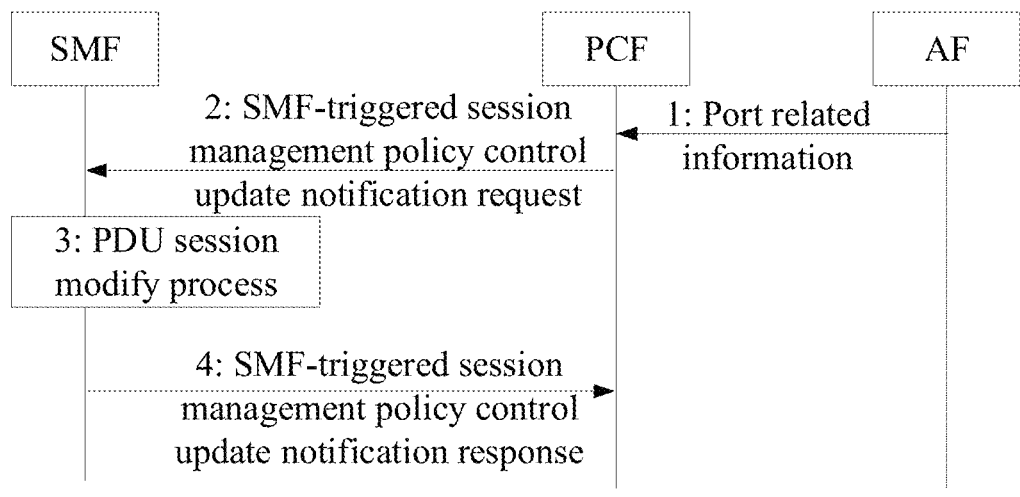
FIG. 6B is a schematic diagram of another application scenario according to an embodiment of the present disclosure.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, in the specification and claims, "and/or" is used to indicate at least one of connected objects. For example, A and/or B represents the following three cases: Only A is included, only B is included, and both A and B exist.

In the embodiments of the present disclosure, the word such as "example" or "for example" is used to represent giving an example, an illustration, or a description. Any embodiment or design scheme described as an "example" in the embodiments of the present disclosure should not be explained as being more preferred or having more advantages than another embodiment or design scheme. Exactly, use of the term "example" or "for example" is intended to present a concept in a specific manner.

The embodiments of the present disclosure are described below with reference to the accompanying drawings. The information control method and the communications device provided in the embodiments of the present disclosure may be applied to a wireless communications system. The wireless communications system may be a 5G system, or an evolved Long Term Evolution (eLTE) system, or a subsequent evolved communications system.

In the embodiments of the present disclosure, time-sensitive may also be referred to as periodic deterministic. Time-sensitive communication may also be referred to as periodic deterministic communication. A time-sensitive data stream may also be referred to as a periodic deterministic data stream. A time-sensitive network technology is, for example, an IEEE Time-Sensitive Network (TSN). Periodic deterministic communication is data transmission in a cycle of a transmission interval.

Referring to FIG. 1, FIG. 1 is a schematic architectural diagram of a wireless communications system to which the embodiments of the present disclosure can be applied. In the embodiments of the present disclosure, a transmit end of a time-sensitive data stream may be referred to as a talker, and a receive end of the time-sensitive data stream may be referred to as a listener. Data may be forwarded between the talker and the listener through one or more bridges. An end station node may be the talker or the listener. A bridge is responsible for data transmission between the talker and the listener.

A terminal (User Equipment (UE)), a time-sensitive translator, and a communications network form a bridge (a 5G bridge is subsequently used as an example for description). For downlink data, a port of a Device-Side Time-Sensitive Network Translator (Device-Side TSN Translator (DS-TT)) may be an egress port of data, and a port of a Network-Side Time-Sensitive Network Translator (Network-Side TSN Translator (NW-TT)) is an ingress port of data. For uplink data, the port of the NW-TT may be an ingress port of data, and the port of the DS-TT is an egress port of data. The terminal may be merged with the DS-TT. A User Plane Function (UPF) may be merged with the NW-TT.

As shown in FIG. 1, one terminal may be connected to one or more DS-TTs, and one or more ports may exist on one DS-TT. One 5G bridge may have one UPF, and one or more ports may be enabled on an NW-TT of the UPF. The terminal may create a Protocol Data Unit (PDU) session with the UPF as a proxy of a port of the DS-TT. Through the PDU session, the port on the DS-TT is associated with a port of the NW-TT that is merged with the UPF. The port of the DS-TT becomes a port of the 5G bridge.

The port of the DS-TT and the port of the NW-TT may be respectively connected to a TSN bridge and/or an end station. Through the 5G bridge, communication may be performed between the TSN bridge and/or the end station connected to the ports of the TTs.

It should be noted that FIG. 1 is only a schematic diagram of an example. In the embodiments of the present disclosure, a structure of the 5G bridge and a connection relationship between ports in the 5G bridge are not limited.

To support embodiment of a bridge formed by a terminal, a time-sensitive translator, and a wireless communications network, the following problems need to be resolved:

Problem 1: A 5G clock exists in a 5G bridge and a TSN clock exists in a TSN network. There is a time difference (for example, a time lag) and a time frequency difference between the 5G clock and the TSN clock. (1) For the time difference, for example, a current time is 1:00 in the 5G clock and 2:00 in the TSN clock. Therefore, corresponding time zones of same time information (for example, a data arrival time) in different clocks may be different. (2) Clock frequencies of different clocks may be different, and therefore time precision is different, for example, a difference between 3.14 seconds and 3.14159 seconds. Time lengths corresponding to same time information (for example, a delay) in different clocks may also be different. A time-sensitive data stream has a high requirement on a time sensitivity degree. A time difference may cause an error in task execution. For example, a production machine in a factory needs to be operated at 00:00:00. If there is a time difference of one hour between a reference clock delivering an instruction and a clock of the machine, the operation is erroneous. If a time precision deviation of 0.1 second exists between the reference clock delivering the instruction and the clock of the machine, a subsequent working convergence error is caused. Therefore, time-related information, such as a data arrival time and a delay, needs to be adjusted according to a difference between the 5G clock and the TSN clock.

Some time-related information is configured for a 5G bridge by a controller (for example, a CNC) of a time-sensitive network (for example, a TSN) or a time-sensitive application, and time-related information based on a TSN clock needs to be adjusted to time-related information based on a 5G clock. Some time-related information is sent by the 5G bridge to the time-sensitive network, and the time-related information based on the 5G clock needs to be adjusted to the clock-related information based on the TSN clock. In the 5G bridge, a Time-Sensitive Network Translator (TSC Translator (TT)) synchronizes with both the 5G clock and the TSN clock to detect a difference between the two clocks. Because an NW-TT and a UPF are merged, the UPF may provide the difference between two clocks for an SMF. The SMF may adjust the time-related information based on the 5G clock to the time-related information based on the TSN clock, or may adjust the time-related information based on the TSN clock to the time-related information based on the 5G clock.

As a control plane egress of the 5G bridge, an AF reports a bridge delay to a CNC. In this case, the bridge delay is a bridge delay based on the TSN clock. In addition, when control information (for example, Per-Stream Filtering and Policing (PSFP) information or traffic forwarding information) of a time-sensitive data stream arrives, a bridge delay corresponding to the time-sensitive data stream needs to be correspondingly mapped to QoS information (including a packet delay) of the data stream, to ensure transmission of time-sensitive data. In this case, the bridge delay is a bridge delay based on the 5G clock. The AF generates the bridge delay according to a UE-DS-TT residence time (also referred to as a delay between ports of UE and a DS-TT) and a Packet Delay Budget (PDB). If only a clock-related bridge delay or time information used to generate a bridge delay (for example, a UE-DS-TT residence time and a PDB) is provided, difference information between the two clocks needs to be frequently synchronized to the AF. This is undoubtedly inefficient.

One solution is to provide the AF with a bridge delay based on two clocks or time information based on two clocks that is used to generate a bridge delay. The AF may send time-related information based on different clocks according to requirements of different nodes.

Problem 2: An AF needs to report a bridge delay to a controller (for example, a CNC) of a time-sensitive network, and a communications network element (for example, a PCF) needs to map a TSN QoS requirement for a TSN data stream to a communications network QoS (for example, a 5G QoS). A delay in the communications network QoS is a PDB, not an overall bridge delay. If the AF provides the PCF with a bridge delay corresponding to a data stream, the PCF further needs to subtract a UE-DS-TT residence time from the bridge delay to map the communication network QoS. This undoubtedly imposes a new requirement on functions of the PCF.

There may be many solutions to problem 2, including but not limited to the following:

(1) In one solution, the AF obtains the bridge delay, and the AF sends the bridge delay to the PCF. After obtaining a delay (for example, a PDB-related delay) by subtracting the UE-DS-TT residence time, the PCF maps the communication network QoS according to the calculated delay.

(2) In another solution, after the AF obtains the bridge delay, the AF subtracts the UE-DS-TT residence time from the bridge delay to obtain delay information, and then sends the delay information to the PCF, and the PCF may directly map the communication network QoS according to the delay.

With reference to problem 1, the bridge delays obtained by the AF in solutions (1) and (2) may be two types of bridge delays respectively corresponding to a 5G clock and a TSN clock, or a bridge delay corresponding to a TSN clock, or a bridge delay corresponding to a 5G clock. The AF may receive a bridge delay or receive time-related information used to calculate a bridge delay to obtain the bridge delay. The bridge delay sent by the AF to the PCF is a bridge delay based on the 5G clock.

(3) In another solution, the AF obtains a bridge delay and a PDB, and the AF may store the PDB. The AF may send a mapped PDB of a data stream (for example, a TSC data stream) to the PCF as a delay requirement of the data stream, and the PCF maps the communication network QoS according to the delay.

With reference to problem 1, the bridge delay in solution (3) may be based on a TSN clock. The PDB may be based on a 5G clock.

(4) In another solution, the AF obtains a UE-DS-TT residence time and a PDB, and the AF may store the PDB. The AF may send a mapped PDB of a data stream (for example, a TSC data stream) to the PCF as a delay requirement of the data stream, and the PCF maps the communication network QoS according to the delay.

With reference to problem 1, the PDB obtained by the AF in solution (4) may be two types of PDBs respectively corresponding to a 5G clock and a TSN clock, or a PDB corresponding to a TSN clock, or a PDB corresponding to a 5G clock. The PDB sent by the AF to the PCF may be a PDB based on the 5G clock.

Problem 3: A 5G bridge delay has only one value and lacks elasticity. For the 5G bridge delay, a maximum delay and a minimum delay are distinguished. Correspondingly, a maximum value and a minimum value may also be distinguished for a PDB used to generate a bridge delay and a UE-DS-TT residence time. The minimum value may be further used to distinguish a minimum value related to a traffic class, and a minimum value not related to a traffic class. The maximum value may be further used to distinguish a maximum value related to a traffic class, and a maximum value not related to a traffic class.

In some embodiments of the present disclosure, obtaining may be understood as generation, obtaining from a configuration, receiving, receiving through a request, obtaining through self-learning, deriving from unreceived information, or obtaining after processing based on received information. This may be determined based on an actual requirement, and is not limited in the embodiments of the present disclosure. For example, when indication information of a capability sent by a device is not received, it may be deduced that the device does not support the capability.

In some embodiments, sending may include broadcasting, broadcasting in a system message, and returning after responding to a request.

In some embodiments, a preconfigured value may be referred to as a default value.

In an embodiment of the present disclosure, a port management container may also be referred to as a port management information container. The port management container is a container that carries port control information (also referred to as port management information).

In an embodiment of the present disclosure, port related information includes a port management container. In an embodiment of the present disclosure, port related information may be understood as any one or more pieces of port related information (for example, port-related configuration information in bridge management in 802.1Q) for bridge management.

In an embodiment of the present disclosure, a port may be one of the following: an Ethernet port and an IP port.

In an embodiment of the present disclosure, a data channel may include but is not limited to one of the following: a PDU session, a PDN connection, a QoS flow, a bearer, and an Internet Protocol Security (IPsec) channel, where the bearer may be an Evolved Radio Access Bearer (E-RAB), a Radio Access Bearer (RAB), a Data Radio Bearer (DRB), a (Signaling Radio Bearers (SRB), or the like.

In an embodiment of the present disclosure, a port pair includes two ports, for example, two ports of a same DS-TT, two ports of different DS-TTs, two ports of a same NW-TT, or two ports of different NW-TTs.

In an embodiment of the present disclosure, a bridge delay is a time used for forwarding a packet from an ingress port of a bridge (for example, a 5G bridge) to an egress port of a bridge. Therefore, ports a DS-TT, UE, a communication network and an NW-TT may form a 5G bridge.

In an embodiment of the present disclosure, a bridge delay may further include a minimum bridge delay and a maximum bridge delay. The minimum bridge delay may further include a minimum bridge delay related to traffic and a minimum bridge delay independent of traffic. The maximum bridge delay may further include a maximum bridge delay related to traffic and a maximum bridge delay independent of traffic.

In an embodiment of the present disclosure, a bridge delay is related to a port pair, which may also be referred to as a delay of the port pair. The delay of the port pair (which may also be referred to as a bridge delay of the port pair) may be a time for a packet to pass through another port from one port. The two ports may be two ports of a same bridge (for example, a 5G bridge). It is not difficult to understand that a bridge delay may be time overheads of a packet passing through a bridge.

For example, a first port pair includes a first port and a second port, and a delay of a port pair may be a time for a packet to pass through the second port from the first port.

In an embodiment of the present disclosure, a delay of a port pair may be a bridge delay of per traffic class (per traffic class). Each port may support one or more traffic classes. Transmission performance of each traffic class is different. Therefore, it is not difficult to understand that each traffic class of an egress port has a delay of a port pair. Delays of a port pair of each traffic class may be different.

In other words, a port delay may be a bridge delay of a traffic class. Certainly, bridge delays of different traffic classes may be the same or different.

In an embodiment of the present disclosure, a TT port, a port of a TT, a port on a TT, a port on a TT side, and a TT side port represent a same meaning and may be interchanged.

In an embodiment of the present disclosure, both a DS-TT port and a port of a DS-TT represent a port on the DS-TT and may be interchanged. In an embodiment of the present disclosure, both an NW-TT port and a port of an NW-TT represent a port on the NW-TT, and may be interchanged.

In an embodiment of the present disclosure, the DS-TT port may also be equivalent to a device side port, and the NW-TT port may also be equivalent to a network side port. When a TT type of a port is a DS-TT, the port may be equivalent to a device side port, and when a TT type of a port is an NW-TT, the port may be equivalent to a network side port. In an embodiment of the present disclosure, related information of a TT on which a first port is located may be referred to as related information of the TT of the first port or TT related information of the first port.

In an embodiment of the present disclosure, a UE-DS-TT residence time is a time taken to forward a packet between a terminal and a port of DS-TT. The UE-DS-TT residence time may also be referred to as one of the following: a UE-DS-TT residence time, a delay between a terminal and a DS-TT, and a delay between the terminal and the port of the DS-TT.

In an embodiment of the present disclosure, the UE-DS-TT residence time may further include a minimum UE-DS-TT residence time, and a maximum UE-DS-TT residence time.

A first UE-DS-TT residence time belongs to the UE-DS-TT residence time. A second UE-DS-TT residence time belongs to the UE-DS-TT residence time.

In an embodiment of the present disclosure, a delay may further include a minimum delay and a maximum delay. The minimum delay may further include a minimum delay related to traffic and a minimum delay independent of traffic. The maximum delay may further include a maximum delay related to traffic and a maximum delay independent of traffic.

In an embodiment of the present disclosure, a PDB is a time taken to forward a packet between a UE and a communications network. The PDB may include the residence time of the UPF and NW-TT.

In an embodiment of the present disclosure, a PDB may further include a minimum PDB and a maximum PDB. The minimum PDB may further include a minimum PDB related to traffic and a minimum PDB independent of traffic. The maximum PDB may further include a maximum PDB related to traffic and a maximum PDB independent of traffic.

In an embodiment of the present disclosure, a clock may also be referred to as a master clock, such as a grand master.

In an embodiment of the present disclosure, a communications network clock may be referred to as a communications network local clock or a communications network internal clock.

In an embodiment of the present disclosure, a time-related service includes a time-sensitive service.

In an embodiment of the present disclosure, a data channel corresponding to a port is generally associated with a port of a DS-TT.

In an embodiment of the present disclosure, the wireless communications network may be referred to as a network or a communications network for short.

In an embodiment of the present disclosure, the wireless communications network may be at least one of the following: a public network and a non-public network.

In an embodiment of the present disclosure, a non-public network is an abbreviation of a non-public network. The non-public network may be referred to as one of the following: a non-public communications network. The non-public network may include at least one of the following deployment manners: a non-public network in independent networking (for example, an SNPN), or a non-public network in non-independent networking (for example, a Closed Access Group (CAG)). In an embodiment of the present disclosure, the non-public network may include or be referred to as a private network. The private network may be referred to as one of the following: a private communications network, a private network, a Local Area Network (LAN), a Private Virtual Network (PVN), an isolated communications network, a dedicated communications network, or another name. It should be noted that a naming manner is not specifically limited in this embodiment of the present disclosure.

In an embodiment of the present disclosure, a PLMN is an abbreviation of a public network. The public network may be referred to as one of the following: a public communications network or another name. It should be noted that a naming manner is not specifically limited in this embodiment of the present disclosure.

In an embodiment of the present disclosure, the communications device may include at least one of the following: a communications network element and a terminal.

In an embodiment of the present disclosure, the communications network element may include at least one of the following: a core network element and a radio access network element.

In this embodiment of the present disclosure, the Core Network element (CN element) may include but is not limited to at least one of the following: a core network device, a core network node, a core network function, a core network element, a Mobility Management Entity (MME), an Access Management Function (AMF), a Session Management Function (SMF), a User Plane Function (UPF), a Serving GW (SGW), a PDN Gateway, a Policy Control Function (PCF), a Policy and Charging Rules Function (PCRF), a Serving GPRS Support Node (SGSN), a Gateway GPRS Support Node (GGSN), a Unified Data Management (UDM), a Unified Data Repository (UDR), a Home Subscriber Server (HSS), an Application Function (AF), and a Centralized Network Configuration (CNC).

In this embodiment of the present disclosure, the Radio Access Network (RAN) element may include but is not limited to at least one of the following: a radio access network device, a radio access network node, a radio access network function, a radio access network unit, a Third Generation Partnership Project (3GPP) radio access network, a non-3GPP radio access network, a Centralized Unit (CU), a Distributed Unit (DU), a base station, an evolved Node B (eNB), a 5G base station (gNB), a Radio Network Controller (RNC), a NodeB, a Non-3GPP Inter Working Function (N3IWF), an Access Controller (AC) node, an Access Point (AP) device, a Wireless Local Area Networks (WLAN) node, and an N3IWF.

The base station may be a Base Transceiver Station (BTS) in a Global System for Mobile Communications (GSM) or Code Division Multiple Access (CDMA), or may be a NodeB in Wideband Code Division Multiple Access (WCDMA), or may be an evolved NodeB (evolutional NodeB, eNB or e-NodeB) and a 5G base station (gNB) in LTE. This is not limited in this embodiment of the present disclosure.

In the embodiments of the present disclosure, UE is a terminal. The terminal may include a relay that supports a function of the terminal and/or a terminal that supports a function of the relay. The terminal may also be referred to as a terminal device or User Equipment (UE). The terminal may be a terminal side device such as a mobile phone, a tablet personal computer, a laptop computer, a Personal Digital Assistant (PDA), a Mobile Internet Device (MID), a wearable device, or an in-vehicle device. It should be noted that a specific type of the terminal is not limited in the embodiments of the present disclosure.

The method and the communications device provided in the embodiments of the present disclosure may be applied to a wireless communications system. The wireless communications system may be a Fifth-Generation (5G) mobile communications system, an Evolved Packet System (EPS), or a subsequent evolved communications system. The wireless communications network in the embodiments of the present disclosure may be a fifth-generation mobile communications network (Fifth-Generation System (5GS)) or an LTE network.

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The following describes the information control method in the embodiments of the present disclosure.

Referring to FIG. 2, an embodiment of the present disclosure provides an information control method, applied to a first communications device. The first communications device includes but is not limited to one of the following: an SMF, UE, a TT (for example, a DS-TT or an NW-TT). As shown in FIG. 2, the method includes the following steps.

Step 21: Adjust first time information to second time information according to information about a clock difference between a first clock and a second clock.

In some embodiments, the first time information is time-related information based on the first clock. The second time information is time-related information based on the second clock.

In an embodiment, the first clock is a communications network clock (for example, a 5G clock), and the second clock is a communications network external clock (for example, a TSN clock). The communications network may constitute a communications network of a bridge (for example, a 5G bridge).

In another embodiment, the first clock is a communications network external clock (for example, a TSN clock), and the second clock is a communications network clock (for example, a 5G clock). The communications network may constitute a communications network of a bridge (for example, a 5G bridge).

In some embodiments, the information about the clock difference includes at least one of the following: a time difference between the first clock and the second clock, and a clock frequency ratio (for example, a rate ratio).

For example, the clock frequency ratio is a ratio of a frequency of the first clock to a frequency of the second clock. In an embodiment, the first clock may be a master clock, for example, a communications network external clock (for example, a TSN clock), and the second clock may be a local clock, for example, a communications network clock (for example, a 5G clock).

In some embodiments, before step 21, at least one piece of the following information is obtained: first information, clock information of the first clock, clock information of the second clock, and the information about the clock difference between the first clock and the second clock.

Step 22: Send first information.

In some embodiments, the first information may include at least one of the following: first time information, second time information, clock information of the first clock (that is, clock information of the first clock corresponding to the first time information), and clock information of the second clock (that is, clock information of the second clock corresponding to the second time information).

(1) In an embodiment, the first information may include the first time information and the second time information. For example, when there are only two types of clocks (for example, a communications network clock (for example, a 5G clock) and a communications network external clock (for example, a TSN clock)), clock types corresponding to the first time information and the second time information may be determined by distinguishing information elements of the first time information and the second time information.

(2) In another embodiment, the first information may include the first time information and/or the clock information of the first clock, and the second time information and/or the clock information of the second clock.

(3) In another embodiment, the first information may include the first time information and/or the clock information of the first clock.

(4) The first information may include the second time information and/or the clock information of the second clock.

In some embodiments, the first time information may include at least one of the following: a first UE-DS-TT residence time, a first PDB, and a first delay (for example, a first bridge delay).

The first UE-DS-TT residence time may be a residence time between a terminal based on the first clock and a DS-TT.

The first PDB may be a PDB based on the first clock. The first PDB may be obtained through configuration, measurement, or receiving.

The first delay (for example, the first bridge delay) may be a delay based on the first clock. The first bridge delay may be a bridge delay based on the first clock.

In an embodiment, the first delay is a sum of values of the first UE-DS-TT residence time and the first PDB. In another embodiment, the first delay is a sum of values of the first UE-DS-TT residence time and a configured PDB.

(1) In an embodiment, the first time information includes at least one of the following: the first UE-DS-TT residence time, and the first PDB. For example, the first communications device may send the first UE-DS-TT residence time and the first PDB to a second communications device. The second communications device may determine the first delay according to the obtained first UE-DS-TT residence time and the first PDB.

(2) In another embodiment, the first time information includes at least one of the following: the first UE-DS-TT residence time. For example, the first communications device sends the first UE-DS-TT residence time to the second communications device, and the second communications device may determine the first delay according to the obtained first UE-DS-TT residence time and a locally configured PDB. The locally configured PDB may be a PDB based on a communications network clock.

(3) In another embodiment, the first time information includes the first delay. For example, the first communications device may determine the first delay, and send the determined first delay to the second communications device. The first communications device may determine the first delay according to the first UE-DS-TT residence time and the first PDB.

In some embodiments, the second time information may include at least one of the following: a second UE-DS-TT residence time, a second PDB, and a second delay (for example, a second bridge delay).

The second UE-DS-TT residence time may be a residence time between a terminal based on the second clock and a DS-TT.

The second PDB may be a PDB based on the second clock. The second PDB may be obtained through configuration, measurement, or receiving.

The second delay (for example, the second bridge delay) may be a delay based on the second clock. The second bridge delay may be a bridge delay based on the second clock.

In an embodiment, the second delay is a sum of values of the second UE-DS-TT residence time and the second PDB. In another embodiment, the second delay is a sum of values of the second UE-DS-TT residence time and a configured PDB.

(1) In an embodiment, the second time information includes at least one of the following: the second UE-DS-TT residence time, and the second PDB. For example, the first communications device sends the second UE-DS-TT residence time and the second PDB to the second communications device. The second communications device may determine the second delay according to the obtained second UE-DS-TT residence time and the second PDB.

(2) In another embodiment, the second time information includes at least one of the following: the second UE-DS-TT residence time. For example, the first communications device sends the second UE-DS-TT residence time to the second communications device, and the second communications device may determine the second delay according to the obtained second UE-DS-TT residence time and a locally configured PDB. The locally configured PDB may be a PDB based on a communications network clock.

(3) In another embodiment, the second time information includes the second delay. For example, the first communications device may determine the second delay, and send the determined second delay to the second communications device. The first communications device may determine the second delay according to the second UE-DS-TT residence time and the second PDB.

In some embodiments, the adjusting first time information to second time information in step 21 may include at least one of the following:

adjusting the first UE-DS-TT residence time to the second UE-DS-TT residence time;

adjusting the first PDB to the second PDB; and adjusting the first delay to the second delay.

In some embodiments, the clock information may include at least one of the following: clock type information, time domain identifier information corresponding to a clock, and clock frequency information.

In some embodiments, the clock type information includes at least one of the following: a type of a communications network clock and a type of a communications network external clock.

Further, the type of the communications network clock may include at least one of the following: a 5G clock, a clock of a 3GPP network, and a clock used by a communications network in a subsequent evolved version (for example, a version after 5G).

Further, the type of the communications network external clock may include at least one of the following: a clock used by a third-party network (for example, a time-sensitive network TSN clock, a clock used by an external network to which a time-sensitive service (for example, a 5G bridge) of a communications network is applied) or a clock used by a third-party application (for example, a third-party application to which a time-sensitive service (for example, a 5G bridge) of a communications network is applied).

In an embodiment, the type of the communications network clock is a 5G clock, and the type of the of the communications network external clock is a TSN clock.

In some embodiments, the sending first information in step 22 may include:

sending the first information to at least one of the following:

an AF, a PCF, an SMF, an AMF, and a terminal.

In an embodiment, the first information is sent to the AF. In an embodiment, the first communications device (for example, an SMF) sends the first information to the AF by using the PCF.

In an embodiment, the first information is sent to the SMF. In an embodiment, the first communications device (for example, UE) sends the first information to the SMF by using the AMF. In this case, the first information may include at least one of the following: the first UE-DS-TT residence time, the second UE-DS-TT residence time, clock information corresponding to the first UE-DS-TT residence time, and clock information corresponding to the second UE-DS-TT residence time.

In an embodiment, the first communications device (for example, a UPF or an NW-TT) sends the first information to the SMF. In this case, the first information may include at least one of the following: the first PDB, the second PDB, clock information corresponding to the first PDB, and clock information corresponding to the second PDB.

In an embodiment, the first information is sent to the UE. In an embodiment, the first communications device (for example, a DS-TT) sends the first information to the UE. In this case, the first information may include at least one of the following: the first UE-DS-TT residence time, the second UE-DS-TT residence time, clock information corresponding to the first UE-DS-TT residence time, and clock information corresponding to the second UE-DS-TT residence time.

In this embodiment, time-related information based on different clocks may be determined and sent based on requirements of different network nodes, so as to implement a time-related service.

Referring to FIG. 3, an embodiment of the present disclosure provides an information control method, applied to a second communications device. The second communications device includes but is not limited to: an AF, an SMF, a terminal, and a TT. As shown in FIG. 3, the method includes the following steps.

Step 31: Obtain first information.

Step 32: Execute at least one of the following operations:

determining a first delay according to the first information;

determining a second delay according to the first information;

determining delay requirement information (for example, a bridge delay or a PDB-related delay) according to the first information;

sending the delay requirement information (for example, bridge delay or a PDB-related delay) to a network element in a communications network;

sending bridge delay information to a third-party network or a third-party application;

executing a first operation when it is determined that a first condition is met; and executing a second operation when it is determined that a second condition is met.

In some embodiments, the first information may include at least one of the following: first time information, second time information, clock information of a first clock, and clock information of a second clock.

In some embodiments, the first time information is time-related information based on the first clock, and the second time information is time-related information based on the second clock.

In an embodiment, the second time information is adjusted according to information about a clock difference between the first clock and the second clock by using the first time information.

In some embodiments, the first information may include at least one of the following: first time information, second time information, clock information of a first clock, and clock information of a second clock. For details, refer to the descriptions in the embodiment in FIG. 2.

In some embodiments, the first time information may include at least one of the following: a first UE-DS-TT residence time, a first PDB, and a first delay (for example, a first bridge delay). For details, refer to the descriptions in the embodiment in FIG. 2.

In some embodiments, the second time information may include at least one of the following: a second UE-DS-TT residence time, a second PDB, and a second delay (for example, a second bridge delay). For details, refer to the descriptions in the embodiment in FIG. 2.

The first PDB may be locally configured, measured, or received by the second communications device.

The second PDB may be locally configured, measured, or received by the second communications device.

1. In some embodiments, the determining a first delay according to the first information may include: determining the first delay according to the first time information, where the first information includes the first time information.

In some embodiments, the first time information includes at least one of the following: a first UE-DS-TT residence time, a first PDB, and a first delay.

The first PDB may be locally configured, measured, or received by the second communications device.

The second PDB may be locally configured, measured, or received by the second communications device.

(1) In an embodiment, the first time information includes at least one of the following: the first UE-DS-TT residence time, and the first PDB. The second communications device may determine the first delay according to the obtained first UE-DS-TT residence time and the first PDB.

(2) In another embodiment, the first time information includes at least one of the following: the first UE-DS-TT residence time. The second communications device may determine the first delay according to the obtained first UE-DS-TT residence time and a locally configured PDB-related delay. The locally configured PDB-related delay may be a PDB-related delay based on a communications network clock.

(3) In another embodiment, the first time information includes the first delay (for example, a first bridge delay). The second communications device directly determines the first delay.

2. In some embodiments, the determining a first delay according to the first information may include: determining the second delay according to the second time information, where the first information includes the second time information.

(1) In an embodiment, the second time information includes at least one of the following: the second UE-DS-TT residence time, and the second PDB. For example, the first communications device sends the second UE-DS-TT residence time and the second PDB to the second communications device. The second communications device may determine the second delay according to the obtained second UE-DS-TT residence time and the second PDB.

(2) In another embodiment, the second time information includes at least one of the following: the second UE-DS-TT residence time. For example, the first communications device sends the second UE-DS-TT residence time to the second communications device, and the second communications device may determine the second delay according to the obtained second UE-DS-TT residence time and a locally configured PDB-related delay. The locally configured PDB-related delay may be a PDB-related delay based on a communications network clock.

(3) In another embodiment, the second time information includes the second delay (for example, a second bridge delay). The second communications device directly determines the second delay.

3. In some embodiments, the delay requirement information is determined according to the first information and/or a configured PDB-related delay.

In some embodiments, the delay requirement information may be one of the following: a bridge delay and a PDB-related delay. In an embodiment, the delay requirement information is delay requirement information of a data stream (for example, a TSN data stream) or a service (for example, a TSN service). The delay requirement information may be used to map communications network QoS information (for example, a 5G QoS). In this case, the bridge delay is a mapped bridge delay of the data stream or the service. The PDB-related delay is a mapped PDB-related delay of the data stream or the service.

(1) In an embodiment, the first information includes at least one of the following: a first UE-DS-TT residence time, a second UE-DS-TT residence time, a first PDB, and a second PDB.

The first PDB may be locally configured, measured, or received by the second communications device.

The second PDB may be locally configured, measured, or received by the second communications device.

For example, if a time precision requirement is not high, the second communications device may determine the bridge delay according to the obtained [first UE-DS-TT residence time or the second UE-DS-TT residence time] and the [first PDB or the second PDB].

For example, if a time precision requirement is high, the second communications device may determine the bridge delay according to the obtained first UE-DS-TT residence time and the first PDB. In this case, the bridge delay may be referred to as a first bridge delay. The first bridge delay may be a bridge delay based on the first clock.

For example, if a time precision requirement is high, the second communications device may determine the bridge delay according to the obtained second UE-DS-TT residence time and the second PDB. In this case, the bridge delay may be referred to as a second bridge delay. The second bridge delay may be a bridge delay based on the second clock.

(2) In another embodiment, the first information includes at least one of the following: a first delay and a second delay. The second communications device may directly determine the bridge delay according to the first delay or the second delay.

The bridge delay determined according to the first delay may be referred to as a first bridge delay. The first bridge delay may be a bridge delay based on the first clock.

The bridge delay determined according to the second delay may be referred to as a second bridge delay. The second bridge delay may be a bridge delay based on the second clock.

(3) In another embodiment, the first information includes at least one of the following: a first PDB and a second PDB.

The first PDB may be locally configured or received by the second communications device.

The second PDB may be locally configured or received by the second communications device.

The second communications device may determine the PDB-related delay according to the obtained first PDB or second PDB.

The PDB-related delay determined according to the first PDB may be referred to as a first PDB-related delay. The first PDB-related delay may be a PDB-related delay based on the first clock.

The PDB-related delay determined according to the second PDB may be referred to as a second PDB-related delay. The second PDB-related delay may be a PDB-related delay based on the second clock.

(4) In another embodiment, the first information includes at least one of the following: a first delay, a first UE-DS-TT residence time, a second delay, and a second UE-DS-TT residence time.

For example, if a time precision requirement is not high, the second communications device may determine the PDB-related delay according to the obtained [first delay or the second delay] and the [first UE-DS-TT residence time or the second UE-DS-TT residence time].

The second communications device may determine the PDB-related delay according to the obtained first delay and the first UE-DS-TT residence time. In this case, the PDB-related delay is referred to as a first PDB-related delay. The first PDB-related delay may be a PDB-related delay based on the first clock.

The second communications device may determine the PDB-related delay according to the obtained second delay and the second UE-DS-TT residence time. In this case, the PDB-related delay is referred to as a second PDB-related delay. The second PDB-related delay may be a PDB-related delay based on the second clock.

4. In some embodiments, in the step of sending the delay requirement information to a network element in a communications network, for example, the network element in the communications network includes a network element (for example, a PCF) responsible for communications network QoS mapping or control. In an embodiment, the step of sending the delay requirement information to a network element in a communications network may be performed in a case that the first condition is not met. In another embodiment, the step of sending the delay requirement information to a network element in a communications network is performed in a case that the first condition is met.

5. In the step of sending bridge delay information to a third-party network or a third-party application, in some embodiments, the third-party network includes a TSN network (for example, a controller CNC of the TSN network). In some embodiments, the bridge delay information is the second delay, for example, is sensitive to time precision. In some embodiments, the bridge delay information may be the first delay (for example, a delay based on a communications network clock), for example, is not sensitive to time precision.

In an embodiment, the step of sending bridge delay information to a third-party network or a third-party application may be performed in a case that the second condition is not met. In another embodiment, the step of sending bridge delay information to a third-party network or a third-party application is performed in a case that the first condition is met.

6. In an embodiment, the first operation is executed when it is determined that the first condition is met. In some embodiments, the first condition may include at least one of the following:

the first clock is a communications network clock (for example, a 5G clock);

obtaining bridge configuration information of a communications network (for example, configuration information of a 5G bridge); and determining the delay requirement information (for example, delay information in TSN QoS information)

for a data stream (for example, a TSN data stream) or a service (for example, a TSN service) based on a preset case.

In some embodiments, the bridge configuration information (for example, the configuration information of the 5G bridge) may include but is not limited to at least one of the following: a TSN QoS requirement, a TSN scheduling parameter, route forwarding information, or PSFP (per-stream filtering and policing) information.

In another embodiment, the second operation is executed when it is determined that the second condition is met. In some embodiments, the second condition may include at least one of the following:

the second clock is a communications network external clock; and sending the bridge delay information (for example, the second delay) to the third-party network (for example, a controller in a TSN network) or the third-party application based on a preset case.

In some embodiments, a type of the communications network clock may include at least one of the following: a 5G clock, a clock of a 3GPP network, and a clock used by a communications network in a subsequent evolved version (for example, a version after 5G).

In some embodiments, a type of the communications network external clock may include at least one of the following: a clock used by a third-party network (for example, a time-sensitive network TSN clock, a clock used by an external network to which a time-sensitive service (for example, a 5G bridge) of a communications network is applied) or a clock used by a third-party application (for example, a third-party application to which a time-sensitive service (for example, a 5G bridge) of a communications network is applied).

In an embodiment, the type of the communications network clock is a 5G clock, and the type of the of the communications network external clock is a TSN clock.

In some embodiments, the first operation may include at least one of the following:

determining the delay requirement information (for example, the bridge delay or the PDB-related delay) according to the first time information; and sending the delay requirement information or the first time information to the network element in the communications network (for example, a QoS control network element (for example, a PCF)).

In some embodiments, the determining the delay requirement information according to the first time information is described above, and details are not described herein again. In an embodiment, the step of determining the delay requirement information according to the first time information may be performed in a case that the first condition is not met. In another embodiment, the step of determining the delay requirement information according to the first time information is performed in a case that the first condition is met.

In an embodiment, the delay requirement information includes delay requirement information based on the first clock, for example, a bridge delay in the delay requirement information is a first bridge delay, and a PDB-related delay in the delay requirement information is a first PDB-related delay.

In an embodiment, the second communications device may send the determined delay requirement information or the first time information to the PCF. The delay requirement information may be used by the PCF to map communications network QoS (5GS QoS) information, such as a 5QI and a PDB, for a data stream (for example, a TSN data stream) or a service (for example, TSN service).

In an embodiment, the delay requirement information may be included in TSN QoS information and sent to the PCF.

In some embodiments, the second operation may include at least one of the following:

determining the second delay (for example, the second bridge delay) according to the second time information; and sending the second delay or the second time information (used by a CNC to determine an end-to-end delay) to the third-party network (for example, a controller CNC of a time-sensitive network) or the third-party application (for example, a third-party application to which a time-sensitive service of a communications network (for example, a 5G bridge) is applied).

In some embodiments, the determining the second delay according to the second time information is described above, and details are not described herein again. In an embodiment, the step of determining the second delay according to the second time information may be performed in a case that the second condition is not met. In another embodiment, the step of determining the second delay according to the second time information is performed in a case that the second condition is met.

In an embodiment, the second communications device may send the second delay or the second time information to the CNC, so that the CNC determines the end-to-end delay.

It is not difficult to understand that in this embodiment, different time-related information may be determined based on requirements of different communications network nodes, and time-related information based on different clocks may be sent based on requirements of different network nodes, thereby implementing a time-related service.

Referring to FIG. 4, an embodiment of the present disclosure further provides an information control method, applied to a third communications device. The third communications device includes but is not limited to UE and a CN element (for example, one of the following: an SMF, a UPF, and a PCF). As shown in FIG. 4, the method includes the following steps.

Step 41: Obtain first information.

STEP 42: Send the first information.

In some embodiments, the first information may include at least one of the following: first time information, second time information, clock information of a first clock, and clock information of a second clock.

In some embodiments, the first time information is time-related information based on the first clock, and the second time information is time-related information based on the second clock.

In an embodiment, the second time information is adjusted according to information about a clock difference between the first clock and the second clock by using the first time information.

In some embodiments, the first time information, the second time information, the clock information of the first clock, and the clock information of the second clock are described in the embodiment of FIG. 2, and details are not described herein again.

In some embodiments, different content of the first information may be obtained from different devices. For example, the first information may be divided into first information on a DS-TT side and first information on an NW-TT side. The first information on the DS-TT side may be obtained from one of the following: a terminal, a DS-TT, and an AMF. The first information on the NW-TT side may be obtained from one of the following: an NW-TT and a UPF.

In an embodiment, the first information on the DS-TT side may include at least one of the following: first time information on the DS-TT side, the clock information of the first clock, and the clock information of the second clock. The first time information on the DS-TT side may include a first UE-DS-TT residence time.

In another embodiment, the first information on the NW-TT side may include at least one of the following: first time information on the NW-TT side, clock information of a first clock, and clock information of a second clock. The first time information on the NW-TT side may include a first PDB.

In an embodiment, when the third communications device is UE, for example, the first information may be obtained from a DS-TT. In some embodiments, the first information may be sent to an AMF.

In another embodiment, when the third communications device is an AMF, for example, the first information may be obtained from UE. In some embodiments, the first information may be sent to an SMF.

In another embodiment, when the third communications device is an SMF, for example, all or a part of the first information may be obtained from one of the following: UE, an AMF, an NW-TT, and a UPF. In some embodiments, the first information may be sent to a PCF or an AF.

In another embodiment, when the third communications device is, for example, an SMF, for example, before the step of sending the first information, the obtained first information may be summarized and sent. For example, the sent first information includes the obtained first information (for example, a PDB) on the DS-TT side and the first information on the NW-TT side (for example, a UE-DS-TT residence time).

In another embodiment, when the third communications device is, for example, an SMF, for example, a PDB may be locally configured or measured, and the PDB is included in the first information for sending. The PDB may be a first PDB and/or a second PDB.

In another embodiment, the third communications device is, for example, an SMF, for example, before the step of sending the first information, the first delay may be determined according to the obtained first PDB and the first UE-DS-TT residence time; and the first delay is included in the sent first information.

In another embodiment, the third communications device is, for example, an SMF, for example, before the step of sending the first information, the second delay may be determined according to the obtained second PDB and the second UE-DS-TT residence time; and the second delay is included in the sent first information.

In another embodiment, when the third communications device is a PCF, for example, the first information may be obtained from one of the following: UE, an AMF, an NW-TT, and a UPF. In some embodiments, the first information may be sent to an AF.

It is not difficult to understand that in this embodiment, determined time-related information may be sent based on a requirement of a communications network node, and time-related information based on different clocks may be sent based on requirements of different network nodes, thereby implementing a time-related service.

Referring to FIG. 5, an embodiment of the present disclosure further provides an information control method, applied to a fourth communications device. The fourth communications device includes but is not limited to a CN element (for example, one of the following: a PCF). As shown in FIG. 5, the method includes the following steps.

Step 51: Obtain delay requirement information and a UE-DS-TT residence time.

Step 52: Execute at least one of the following according to the delay requirement information and the UE-DS-TT residence time: determining a PDB-related delay, and mapping a communications network QoS.

In an embodiment, the communications network QoS is mapped according to the determined PDB-related delay. In another embodiment, the communications network QoS is mapped according to the delay requirement information.

In an embodiment, the delay requirement information may be obtained from an AF.

In an embodiment, the UE-DS-TT residence time may be obtained from one of the following: a PCF and an SMF.

In some embodiments, the delay requirement information may be one of the following:

a bridge delay and a PDB-related delay. In an embodiment, the delay requirement information is delay requirement information of a data stream (for example, a TSN data stream) or a service (for example, a TSN service). The bridge delay is a mapped bridge delay of the data stream or the service. The PDB-related delay is a mapped PDB-related delay of the data stream or the service.

In an embodiment, when the delay requirement information is the bridge delay, the PDB-related delay may be determined according to the delay requirement information and the UE-DS-TT residence time, and the UE-DS-TT residence time may be a first UE-DS-TT residence time. The first UE-DS-TT residence time is based on a first clock. The first clock is a communications network clock. The communications network QoS may be mapped according to the PDB-related delay. In another embodiment, when the delay requirement information is the PDB-related delay, the communications network QoS is mapped according to the delay requirement information.

In an embodiment, for example, in a case that the delay requirement information is sensitive to time precision, the delay requirement information and/or the UE-DS-TT residence time may be based on a communications network clock (for example, a 5G clock). In this case, the UE-DS-TT residence time may be the first UE-DS-TT residence time. The first UE-DS-TT residence time is a residence time between a terminal based on the first clock and a DS-TT. The first clock is a communications network clock.

In another embodiment, the delay requirement information may be delay requirement information based on any clock. For example, in a case that the delay requirement information is not sensitive to time precision, the UE-DS-TT residence time may be a residence time between a terminal based on any clock and a DS-TT. In this case, the UE-DS-TT residence time may be the first UE-DS-TT residence time or a second UE-DS-TT residence time.

In another embodiment, the delay requirement information may be based on a communications network clock (for example, a 5G clock) or based on a communications network external clock (for example, a TSN clock). For example, in a case that the delay requirement information is not sensitive to time precision, the UE-DS-TT residence time may be based on a communications network clock (for example, the first UE-DS-TT residence time) or based on a communications network external clock (for example, the second UE-DS-TT residence time).

In an embodiment, the UE-DS-TT residence time may be obtained by obtaining first information. In some embodiments, the first information may be obtained from at least one of the following: an AF and an SMF. The first information is described in the embodiment in FIG. 2. The UE-DS-TT residence time may be the first UE-DS-TT residence time or the second UE-DS-TT residence time in the first information. The first clock may be a communications network clock (for example, a 5G clock).

In some embodiments, before step 51, a PCF obtains the first information, and the PCF may execute at least one of the following: storing the first UE-DS-TT residence time and/or the second UE-DS-TT residence time in the first information, and sending the first information to the AF.

In an embodiment, the determining a PDB-related delay according to the delay requirement information and the UE-DS-TT residence time includes: the PDB-related delay is equal to the delay requirement information minus the UE-DS-TT residence time.

In an embodiment, the UE-DS-TT residence time is a residence time between a terminal related to a DS-TT port corresponding to the data stream and a DS-TT.

It is not difficult to understand that, in this embodiment, communications network Qos mapping corresponding to a delay element of a data stream or a service can be supported, thereby implementing a time-related service.

In the following, the methods provided in the embodiments of the present disclosure are described with reference to embodiments.

EMBODIMENT 1

As shown in FIG. 6A, this embodiment includes the following steps.

Step 1: In some embodiments, UE sends first information on a DS-TT side to an SMF. The first information on the DS-TT side may include at least one of the following: a first UE-DS-TT residence time, and a UE-DS-TT second residence time.

The UE requests to create a PDU session on a DS-TT port. In some embodiments, the first information on the DS-TT side is indicated in a PDU session create request or a PDU session modify request.

In an embodiment, the first information on the DS-TT side may include at least one of the following: the first UE-DS-TT residence time, the second UE-DS-TT residence time, clock information of a first clock corresponding to the first UE-DS-TT residence time, and clock information of a second clock corresponding to the second UE-DS-TT residence time.

In another embodiment, the first information on the DS-TT side may include at least one of the following: first time information on the DS-TT side, clock information of a first clock, and clock information of a second clock. The first time information on the DS-TT side may include a first UE-DS-TT residence time.

The first information may be excluded a port management information container or included in a port management information container.

Step 2: An AMF sends a PDU session modify request message or a PDU session create request message to the SMF. In some embodiments, the request message includes the first information.

Step 3: The SMF sends an N4 session modify request message or an N4 session create request message to a UPF.

Step 4: In some embodiments, the UPF sends first information on an NW-TT side to the SMF.

The UPF sends an N4 session modify response message or an N4 session create response message to the SMF. In some embodiments, the response message includes the first information on the NW-TT side.

In an embodiment, the first information on the NW-TT side may include at least one of the following: a first PDB, a second PDB, clock information of a first clock corresponding to the first PDB, and clock information of a second clock corresponding to the second PDB.

In another embodiment, the first information on the NW-TT side may include at least one of the following: first time information on the NW-TT side, clock information of a first clock, and clock information of a second clock. The first time information on the NW-TT side may include a first PDB.

Step 5: In an embodiment, the SMF executes the operation in the embodiment in FIG. 2.

For example, the SMF adjusts first time information to second time information according to information about a clock difference between a first clock and a second clock, where the first time information is time-related information based on the first clock, and the second time information is time-related information based on the second clock; and first information is sent. In some embodiments, the first information may include at least one of the following: first time information, second time information, clock information of a first clock corresponding to the first time information, and clock information of a second clock corresponding to the second time information.

In another embodiment, the SMF executes the operation in the embodiment in FIG. 4. For example, first information is obtained; and the first information is sent. The first information may be first information on a DS-TT side and first information on an NW-TT side.

The SMF sends an SMF-triggered session management policy association modify request message or an SMF-triggered session management policy association create request message to the PCF. In some embodiments, the request message includes the first information (as described in the embodiment in FIG. 2).

The first information sent by the SMF to the PCF may include at least one of the following: first time information, second time information, clock information of a first clock corresponding to the first time information, and clock information of a second clock corresponding to the second time information. For details, refer to the descriptions in the embodiment in FIG. 2.

Step 6: The PCF sends the first information to an AF, where the first information is described in the embodiment in FIG. 2.

In some embodiments, the AF executes the operation in the embodiment in FIG. 3.

For example, the AF obtains first information, and the AF executes at least one of the following operations:

determining a first delay according to the first information;

determining a second delay according to the first information;

executing a first operation when it is determined that a first condition is met; and executing a second operation when it is determined that a second condition is met.

In some embodiments, when it is determined that the second condition is met, the AF executes the second operation. The second operation may include at least one of the following:

determining the second delay (for example, a second bridge delay) according to the second time information; and sending the second delay or the second time information a controller of a time-sensitive network such as a CNC for the CNC to determine an end-to-end delay.

Step 7: The AF sends an event notification response to a PCF.

Step 8: The PCF sends an SMF trigger session management policy association modify response/SMF trigger session management policy association create response to the SMF.

Step 9: The SMF sends a PDU session_update session management context response/PDU session_create session management context response to the AMF.

Step 10: The AMF sends an NAS message to the UE, where the NAS message includes PDU session modify accept/PDU session create accept.

Embodiment 2

As shown in FIG. 6B, this embodiment includes the following steps.

Step 1: An AF obtains information about a time-sensitive data stream.

In some embodiments, the AF executes the operation in the embodiment in FIG. 3.

For example, the AF obtains first information, and the AF executes at least one of the following operations:

determining a first delay according to the first information;

determining a second delay according to the first information;

determining delay requirement information (for example, a bridge delay or a PDB-related delay) according to the first information. In some embodiments, when it is determined that a first condition is met, the AF executes a first operation.

For example, the first operation may include at least one of the following:

determining a first delay (for example, a first bridge delay) according to first time information; and sending the first delay or the first time information to a network element in a communications network (for example, a QoS control network element (for example, a PCF)); for example, the first delay or the first time information is sent to the PCF, so that the PCF maps 5GS QoS information, such as a 5QI and a delay.

In an embodiment, the first delay is included in TSN QoS information and sent to the PCF.

Step 2: The AF sends the first delay to the PCF. The PCF may execute the operation in FIG. 5.

After determining mapped QoS information of the time-sensitive data stream, the PCF sends an updated PCC rule to an SMF.

Step 3: The SMF triggers a PDU session modify process according to the updated PCC rule.

Step 4: The SMF returns a response to the PCF.

Embodiment 3

As shown in FIG. 6A, this embodiment includes the following steps.

Step 1: In some embodiments, UE sends first information on a DS-TT side to an SMF.

The UE requests to create a PDU session on a DS-TT port. In some embodiments, the first information on the DS-TT side is indicated in a PDU session create request or a PDU session modify request.

In an embodiment, the first information on the DS-TT side may include at least one of the following: a first UE-DS-TT residence time, a second UE-DS-TT residence time, clock information of a first clock, and clock information of a second clock.

In another embodiment, the first information on the DS-TT side may include at least one of the following: first time information on the DS-TT side, clock information of a first clock, and clock information of a second clock. The first time information on the DS-TT side may include a first UE-DS-TT residence time.

The first information may be excluded a port management information container or included in a port management information container.

Step 2: An AMF sends a PDU session modify request message or a PDU session create request message to the SMF. In some embodiments, the request message includes the first information.

Step 3: The SMF sends an N4 session modify request message or an N4 session create request message to a UPF.

Step 4: The UPF sends an N4 session modify response message or an N4 session create response message to the SMF.

Step 5: In an embodiment, the SMF executes the operation in the embodiment in FIG. 2.

In another embodiment, the SMF may execute the operation in the embodiment in FIG. 4.

The SMF sends an SMF-triggered session management policy association modify request message or an SMF-triggered session management policy association create request message to the PCF. In some embodiments, the request message includes the first information (as described in the embodiment in FIG. 2).

The first information sent by the SMF to the PCF may include at least one of the following: first time information, second time information, clock information of a first clock corresponding to the first time information, and clock information of a second clock corresponding to the second time information. For details, refer to the descriptions in the embodiment in FIG. 2.

Step 6: The PCF sends the first information to an AF, where the first information is described in the embodiment in FIG. 2.

In some embodiments, the AF executes the operation in the embodiment in FIG. 3. For example, the AF obtains first information, and the AF executes at least one of the following operations:

determining a first delay according to the first information;

determining a second delay according to the first information;

executing a first operation when it is determined that a first condition is met; and executing a second operation when it is determined that a second condition is met.

In some embodiments, when it is determined that the second condition is met, the AF executes the second operation. The second operation may include at least one of the following:

determining the second delay (for example, a second bridge delay) according to the second time information; and sending the second delay or the second time information a controller of a time-sensitive network such as a CNC for the CNC to determine an end-to-end delay.

Step 7: The AF sends an event notification response to a PCF.

Step 8: The PCF sends an SMF trigger session management policy association modify response/SMF trigger session management policy association create response to the SMF.

Step 9: The SMF sends a PDU session_update session management context response/PDU session_create session management context response to the AMF.

Step 10: The AMF sends an NAS message to the UE, where the NAS message includes PDU session modify accept/PDU session create accept.

Figure 7:
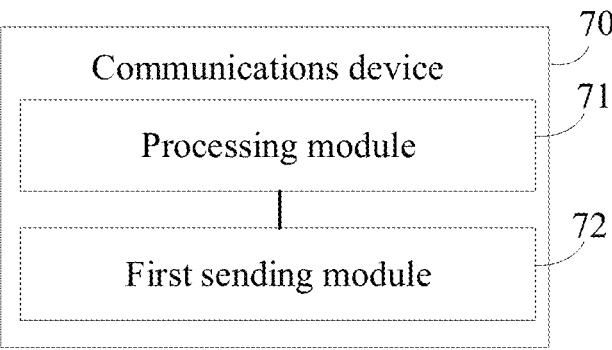
FIG. 7 is a structural diagram of a communications device according to the present disclosure.

Referring to FIG. 7, an embodiment of the present disclosure provides a communications device. The communications device is a first communications device, and the first communications device includes but is not limited to: an SMF, UE, and a TT (for example, a DS-TT). As shown in FIG. 7, the communications device 70 includes:

a processing module 71, configured to adjust first time information to second time information according to information about a clock difference between a first clock and a second clock, where the first time information is time-related information based on the first clock, and the second time information is time-related information based on the second clock; and a first sending module 72, configured to send first information, where the first information includes at least one of the following: the first time information, the second time information, clock information of the first clock, and clock information of the second clock.

In some embodiments, the first time information includes at least one of the following: a first UE-DS-TT residence time, a first PDB, and a first delay;

and/or the second time information includes at least one of the following: a second UE-DS-TT residence time, a second PDB, and a second delay.

In some embodiments, the adjusting first time information to second time information includes at least one of the following:

adjusting the first UE-DS-TT residence time to the second UE-DS-TT residence time;

adjusting the first PDB to the second PDB; and adjusting the first delay to the second delay.

In some embodiments, the clock information includes at least one of the following: clock type information, time domain identifier information corresponding to a clock, and clock frequency information.

In some embodiments, the clock type information includes at least one of the following:

a type of a communications network clock and a type of a communications network external clock.

In some embodiments, the type of the communications network clock is a 5G clock, and the type of the communications network external clock is a time-sensitive network TSN clock.

In some embodiments, the first sending module 72 is configured to:

send the first information to at least one of the following: an AF, a PCF, an SMF, an AMF, and a terminal.

In this embodiment, the communications device 70 can implement the processes implemented by the first communications device in the method embodiments of the present disclosure and achieve a same beneficial effect. To avoid repetition, details are not described herein again.

Figure 8:
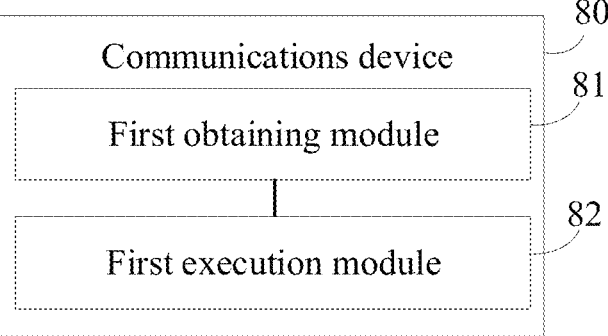
FIG. 8 is a structural diagram of another communications device according to the present disclosure.

Referring to FIG. 8, an embodiment of the present disclosure provides a communications device. The communications device is a second communications device, and the second communications device includes but is not limited to an AF. As shown in FIG. 8, the communications device 80 includes:

a first obtaining module 81, configured to obtain first information; and a first execution module 82, configured to execute at least one of the following operations:

determining a first delay according to the first information;

determining a second delay according to the first information;

determining delay requirement information according to the first information;

sending the delay requirement information to a network element in a communications network;

sending bridge delay information to a third-party network or a third-party application;

executing a first operation when it is determined that a first condition is met; and executing a second operation when it is determined that a second condition is met, where the first information includes at least one of the following: first time information, second time information, clock information of a first clock, and clock information of a second clock;

the first time information is time-related information based on the first clock;

the second time information is time-related information based on the second clock;

the first condition includes: the first clock is a communications network clock; and the second condition includes: the second clock is a communications network external clock.

In some embodiments, the first operation includes at least one of the following:

determining the delay requirement information according to the first time information; and sending the delay requirement information and/or the first time information to the network element in the communications network. In some embodiments, the second operation includes at least one of the following:

determining the second delay according to the second time information; and sending the second delay and/or the second time information to the third-party network or the third-party application.

In this embodiment, the communications device 80 can implement the processes implemented by the first communications device in the method embodiments of the present disclosure and achieve a same beneficial effect. To avoid repetition, details are not described herein again.

Figure 9:
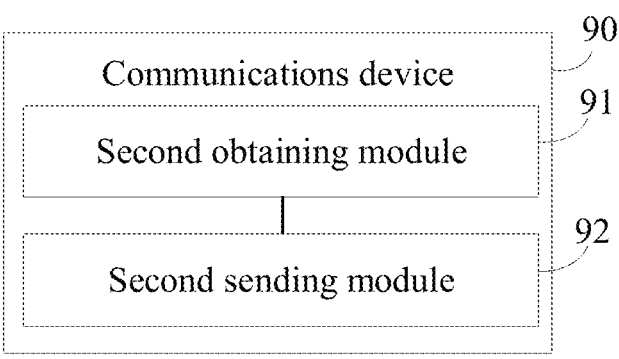
FIG. 9 is a structural diagram of another communications device according to the present disclosure.

Referring to FIG. 9, an embodiment of the present disclosure provides a communications device. The communications device is a third communications device, and the third communications device includes but is not limited to UE and a CN element (for example, one of the following: an SMF, a UPF, and a PCT). As shown in FIG. 9, the communications device 90 includes:

a second obtaining module 91, configured to obtain first information; and a second sending module 92, configured to send the first information, where the first information includes at least one of the following: first time information, second time information, clock information of a first clock, and clock information of a second clock; the first time information is time-related information based on the first clock; and the second time information is time-related information based on the second clock.

In some embodiments, the third communications device is a terminal; and the second obtaining module 91 is configured to obtain the first information from a DS-TT; and the second sending module 92 is configured to send the first information to an access mobility management function AMF;

or the third communications device is an AMF; and the second obtaining module 91 is configured to obtain the first information from a terminal; and the second sending module 92 is configured to send the first information to an SMF;

or the third communications device is an SMF; and the second obtaining module 91 is configured to obtain the first information from one of the following: a terminal, an AMF, an NW-TT, and a UPF; and the second sending module 92 is configured to send the first information to a PCF or an AF;

or the third communications device is a PCF; and the second obtaining module 91 is configured to obtain the first information from one of the following: a terminal, an AMF, an NW-TT, and a UPF; and the second sending module 92 is configured to send the first information to an AF.

In this embodiment, the communications device 90 can implement the processes implemented by the third communications device in the method embodiments of the present disclosure and achieve a same beneficial effect. To avoid repetition, details are not described herein again.

Figure 10:
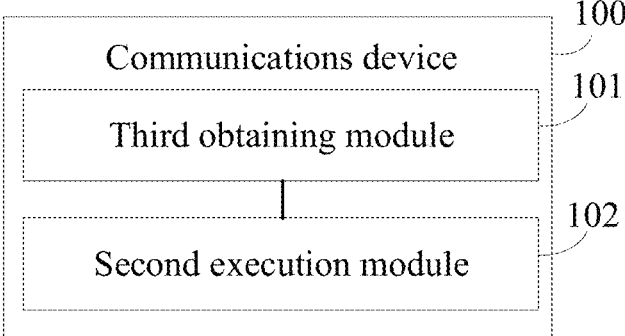
FIG. 10 is a structural diagram of another communications device according to the present disclosure.

Referring to FIG. 10, an embodiment of the present disclosure provides a communications device. The communications device is a fourth communications device, and the fourth communications device includes but is not limited to a CN element (for example, a PCT). As shown in FIG. 10, the communications device 100 includes:

a third obtaining module 101, configured to obtain delay requirement information and a UE-DS-TT residence time; and a second execution module 102, configured to execute at least one of the following according to the delay requirement information and the UE-DS-TT residence time: determining a PDB-related delay, and mapping a communications network quality of service QoS.

In some embodiments, the delay requirement information is one of the following: a bridge delay and a PDB-related delay.

In this embodiment, the communications device 100 can implement the processes implemented by the fourth communications device in the method embodiments of the present disclosure and achieve a same beneficial effect. To avoid repetition, details are not described herein again.

Figure 11:
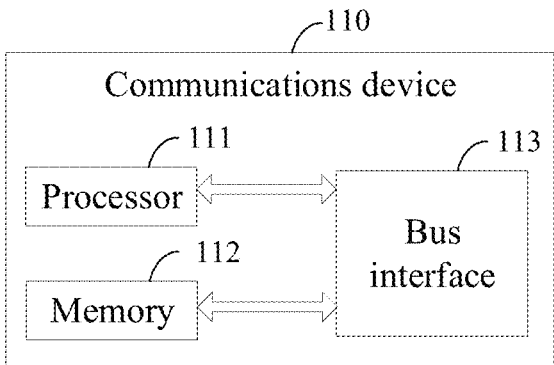
FIG. 11 is a structural diagram of another communications device according to the present disclosure.

Referring to FIG. 11, FIG. 11 is a schematic structural diagram of another communications device according to an embodiment of the present disclosure. As shown in FIG. 11, the communications device 110 includes a processor 111, a memory 112, and a computer program stored in the memory 112 and running on the processor. Components in the communications device 110 are coupled together by using a bus interface 113. When the computer program is executed by the processor 111, the processes implemented in the method embodiment shown in FIG. 2 may be implemented, or the processes implemented in the method embodiment shown in FIG. 3 are implemented, or the processes implemented in the method embodiment shown in FIG. 4 are implemented, or the processes implemented in the method embodiment shown in FIG. 5 are implemented, and a same technical effect can be achieved. To avoid repetition, details are not described herein again.

An embodiment of the present disclosure further provides a computer-readable storage medium. The computer-readable storage medium stores a computer program, and when the computer program is executed by a processor, the processes of the method embodiment of any one of the foregoing information control methods are implemented and a same technical effect can be achieved. To avoid repetition, details are not described herein again. The computer-readable storage medium is, for example, a Read-Only Memory (ROM), a Random Access Memory (RAM), a magnetic disk, or an optical disc.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element.

Based on the descriptions of the foregoing embodiments, a person skilled in the art may clearly understand that the method in the foregoing embodiment may be implemented by software in addition to a necessary universal hardware platform or by hardware only. Based on such an understanding, the technical solutions of the present disclosure essentially or the part contributing to the prior art may be implemented in a form of a software product. The computer software product is stored in a storage medium (for example, a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific embodiments, and the above specific embodiments are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A first communications device, comprising:

a memory storing computer-readable instructions; and a processor coupled to the memory and configured to execute the computer-readable instructions, wherein the computer-readable instructions, when execute by the processor, cause the processor to perform operations comprising:

adjusting first time information to second time information according to information about a clock difference between a first clock and a second clock, wherein the first time information is time-related information based on the first clock, and the second time information is time-related information based on the second clock; and sending first information, wherein the first information comprises at least the first time information, wherein the first time information comprises at least one of the following: a first User Equipment (UE)-Device-Side Time-Sensitive Network Translator (Device-Side TSN Translator (DS-TT)) residence time, or a first Packet Delay Budget (PDB).

2. The first communications device according to claim 1, wherein the first time information comprises a first delay.

3. The first communications device according to claim 2, wherein the first information further comprises the second time information, wherein the second time information comprises at least one of the following: a second UE-DS-TT residence time, a second PDB, or a second delay; and the adjusting first time information to second time information comprises at least one of the following:

adjusting the first UE-DS-TT residence time to the second UE-DS-TT residence time;

adjusting the first PDB to the second PDB; or adjusting the first delay to the second delay.

4. The first communications device according to claim 1, wherein the first information further comprises the clock information of the first clock or the second clock, wherein the clock information comprises at least one of the following: clock type information, time domain identifier information corresponding to a clock, or clock frequency information.

5. The first communications device according to claim 4, wherein the clock type information comprises at least one of the following:

a type of a communications network clock or a type of a communications network external clock.

6. The first communications device according to claim 5, wherein the type of the communications network clock is a 5G clock, and the type of the communications network external clock is a Time-Sensitive Network (TSN) clock.

7. The first communications device according to claim 1, wherein the sending first information comprises:

sending the first information to at least one of the following:

an Access Function (AF), a Policy Control Function (PCF), a Session Management Function (SMF), an Access Mobility Management (AMF), or a terminal.

8. A second communications device, comprising:

a memory storing computer-readable instructions; and a processor coupled to the memory and configured to execute the computer-readable instructions, wherein the computer-readable instructions, when executed by the processor, cause the processor to perform first operations comprising:

obtaining first time information, wherein the first time information comprises at least one of the following:

a first User Equipment (UE)-Device-Side Time-Sensitive Network Translator (Device-Side TSN Translator (DS-TT)) residence time, a first bridge delay, or a first Packet Delay Budget (PDB); and executing at least one of the following second operations:

determining a PDB-related delay according to the first UE-DS-TT residence time and the first bridge delay;

determining the PDB-related delay according to the first PDB obtained by the second communications device, wherein the first PDB is locally configured; or sending the PDB-related delay to a control network element responsible for Quality of Service (QoS) mapping of a communications network;

wherein the PDB-related delay is used to map a PDB of the communications network, wherein the first PDB is a time taken to forward a packet between a UE and the communications network, wherein the first PDB comprises the residence time of a User Plane Function (UPF) and a Network-Side Time-Sensitive Network Translator (Network-Side TSN Translator (NW-TT)), and wherein the second communications device is configured to serve as a core network element, and the core network element is different from a Policy Control Function (PCF).

9. The second communications device according to claim 8, wherein determining the PDB-related delay according to the first UE-DS-TT residence time and the first bridge delay further comprises:

determining the PDB-related delay according to the first bridge delay minus the first UE-DS-TT residence time.

10. The second communications device according to claim 8, wherein the control network element responsible for QoS mapping of the communication network is the PCF, or the core network element comprises one of the following: an Access Function (AF), or a Session Management Function (SMF).

11. The second communications device according to claim 8, wherein the first operations further comprise:

sending bridge delay information to a third-party network or a third-party application.

12. A non-transitory computer-readable medium storing instructions that, when executed by a processor of a second communications device, cause the processor to perform first operations comprising:

obtaining first time information, wherein the first time information comprises at least one of the following:

a first User Equipment (UE)-Device-Side Time-Sensitive Network Translator (Device-Side TSN Translator (DS-TT)) residence time, a first bridge delay, or a first Packet Delay Budget (PDB); and executing at least one of the following second operations:

determining a PDB-related delay according to the first UE-DS-TT residence time and the first bridge delay;

determining the PDB-related delay according to the first PDB obtained by the second communications device, wherein the first PDB is locally configured; or sending the PDB-related delay to a control network element responsible for Quality of Service (QoS) mapping of a communications network;

wherein the PDB-related delay is used to map a PDB of the communications network, wherein the first PDB is a time taken to forward a packet between a UE and the communications network, wherein the first PDB comprises the residence time of a User Plane Function (UPF) and a Network-Side Time-Sensitive Network Translator (Network-Side TSN Translator (NW-TT)), and wherein the second communications device is configured to serve as a core network element, and the core network element is different from a Policy Control Function (PCF).

13. The non-transitory computer-readable medium according to claim 12, wherein determining the PDB-related delay according to the first UE-DS-TT residence time and the first bridge delay further comprises:

determining the PDB-related delay according to the first bridge delay minus the first UE-DS-TT residence time.

14. The non-transitory computer-readable medium according to claim 12, wherein the control network element responsible for QoS mapping of the communication network is the PCF, or the core network element comprises one of the following: an Access Function (AF), or a Session Management Function (SMF).

15. The non-transitory computer-readable medium according to claim 12, wherein the first operations further comprise:

sending bridge delay information to a third-party network or a third-party application.

* * * * *